United States Patent [19]

Shedd et al.

[11] 4,374,952
[45] Feb. 22, 1983

[54] NITRILE RUBBER/EPDM GRAFT BLENDS

[75] Inventors: Charles D. Shedd, Naugatuck; Allen L. Stone, Cheshire, both of Conn.

[73] Assignee: Uniroyal, Inc., New York, N.Y.

[21] Appl. No.: 168,874

[22] Filed: Jul. 14, 1980

[51] Int. Cl.³ .......................... C08L 9/02; C08L 51/04
[52] U.S. Cl. .......................................... 525/87; 525/86
[58] Field of Search .................................... 525/86, 87

[56] References Cited

U.S. PATENT DOCUMENTS 3,489,821 1/1970 Witt et al. ............................ 260/876
3,642,950 2/1972 O'Shea ................................ 260/878

Primary Examiner—Carman J. Seccuro
Attorney, Agent, or Firm—Anthony Lagani, Jr.

[57] ABSTRACT

A polymer composition comprising a blend of NBR elastomer with EPDM grafted with acrylonitrile or acrylonitrile copolymer, imparts oil and ozone resistance to the blend.

15 Claims, No Drawings

NITRILE RUBBER/EPDM GRAFT BLENDS

BACKGROUND OF THE INVENTION

It is well known that blends of elastomers such as acrylonitrile-butadiene copolymers (NBR) containing polar groups are not compatible with hydrocarbon rubbers such as ethylene-propylene rubbers. It is possible, however, to blend nitrile rubbers with certain polar resins such as styrene acrylonitrile; see for example U.S. Pat. No. 2,439,202. Blends of nitrile rubbers with acrylonitrile/butadiene/styrene resins have been prepared; see for example Japanese Pat. No. S-7-5013369. These blends have also been prepared incorporating a third component such as polyvinylchloride; see for example U.S. Pat. No. 3,629,050.

Graft polymers of ethylene propylene terpolymers wherein the third monomer is a non-conjugated diene (EPDM) have been prepared wherein the graft polymer comprises styrene acrylonitrile resins (SAN). These grafts of SAN on an EPDM backbone are known as EPAS. EPAS has been successfully blended with SAN to prepare weather resistant, impact resistant resins; see for example U.S. Pat. Nos. 3,489,821 and 3,489,822.

NBR has good solvent resistance but poor ozone resistance and heat aging properties. The poor qualities are believed to be the result of sites of unsaturation in the backbone which permits scission of the polymer chain to occur under certain adverse conditions. EPDM, on the other hand has good heat aging and ozone resistance because its unsaturation sites are in side chains which render the polymer generally immune to scission of the backbone chain. However, these hydrocarbon rubbers have poor solvent resistance even in the cured state.

It has been postulated that blends of EPDM and NBR would exhibit a desirable balance of heat, ozone and solvent resistance. However, these rubbers are incompatible, and blends thereof are not homogeneous. Consequently, they have poor physical properties such as tensile, modulus, elongation and tear strength and have little practical value.

SUMMARY OF THE INVENTION

It has surprisingly been found that where EPDM is grafted with acrylonitrile it becomes compatible with NBR and blends of these rubbers exhibit good physical properties both as a fully cured rubber vulcanizate and as partially cured blends yielding thermoplastic elastomers. The graft may comprise a copolymer such as styrene-acrylonitrile rather than acrylonitrile alone.

Physical properties as well as rheological characteristics of the blends may be varied by altering the ratio of EPDM to graft monomers in the graft polymer. Additionally, it is possible to alter the blend properties by varying the ratio of butadiene and acrylonitrile in the NBR.

DETAILED DESCRIPTION

This invention relates to blends of nitrile rubber (NBR) with modified EPDM rubbers. More particularly it relates to blends of NBR with an EPDM which has been made compatible with NBR by grafting onto the EPDM backbone a polymer comprising acrylonitrile or acrylonitrile and an ethylenically unsaturated aromatic monomer e.g. styrene. The preferred graft polymer is styrene-acrylonitrile.

The term "EPDM" as used in the specification and claims means essentially amorphous terpolymers of ethylene an alpha-olefin having 3 to 5 carbon atoms, e.g. propylene, and a non-conjugated diene monomer as well as ethylene-propylene copolymer. Illustrative non-limiting examples of the non-conjugated dienes which may be used are dicyclopentadiene, 5-methylidene-2-norbornene, 5-ethylidene-2-norbornene and 1,4 hexadiene.

Through the EPDM generally contains about 20 to about 65 percent by weight of propylene it more typically comprises about 25 to about 55 percent by weight propylene. The EPDM has incorporated into it about 0.1% to about 10% non-conjugated diene. Typically, the diene content gives rise to iodine numbers of about 5 to about 25.

Methods of preparing the EPDM graft polymers are well known in the art. For example EPAS may be prepared by grafting styrene-acrylonitrile to the EPDM backbone in the manner taught in U.S. Pat. Nos. 3,489,821; 3,489,822 and 3,642,950 all of which are incorporated herein by reference.

The term "EPAS" as used in the specification and claims means an EPDM polymer onto which has been grafted a polymer comprising at least acrylonitrile (ACN). The graft may also include an ethylinically unsaturated aromatic monomer such as styrene, alpha-methylstyrene, vinyltoluene, tert-butylstyrene and chloro-styrene. Illustrative combinations of acrylonitrile and aromatic monomers useful in the EPAS are styrene/ACN; alpha-methylstyrene/ACN; chloro-styrene/ACN etc.

The weight ratio of the aromatic monomer to acrylonitrile can vary from 90/10 to about 10/90; preferably about 80/20 to about 60/40. The degree of grafting, defined as the average fractional weight of grafted monomer to the weight of EPDM may vary from about 0.05 to about 1.0; preferably about 0.15 to about 0.8; more preferably about 0.3 to about 0.7.

In the course of preparing the EPAS not all of the resin monomers will be grafted onto the backbone. The ungrafted resin polymer so formed is termed "free resin" as used in the specification and claims. Generally, the free resin has the same composition as the resin polymers grafted to the EPDM. The term "graft resin" as used in the specification and claims means the monomer mixture which has been polymerized and actually grafted onto the EPDM to form the EPAS. Though EPAS polymers have been prepared wherein the graft resin comprises about 5 to 90% by weight of the total EPAS, for the purposes of this invention the graft resin comprises about 5 to about 70% by weight of EPAS; more preferably about 10 to about 60%; most preferably about 20 to about 50%; e.g., 40%.

In the final product the EPAS can contain ungrafted EPDM, as well as free resin. Additionally, resin or polymer similar to the free resin and EPDM may be added to the EPAS for use in this invention. The preferred EPAS, is a graft of styrene and acrylonitrile with EPDM. The ratios of styrene and acrylonitrile useful in this invention can be the same as those described above for other acrylonitrile/aromatic monomer mixtures.

The NBR which may be used in the practice of this invention includes any of the acrylonitrile-butadiene copolymers which are well known in the art. These polymers can contain a minor amount of a third monomer such as divinylbenzene. Though the NBR can comprise about 20 to about 50 weight percent acrylonitrile it preferably is comprised of about 33 to about 45 weight percent acrylonitrile. The commercially available nitrile rubbers useful in the practice of this invention are preferably characterized in having a Mooney Viscosity of about 30 to about 80 at 100° C.

In addition to the NBR and EPAS the compositions of this invention can include any of the conventional additives, fillers and curatives used in the preparation of EPDM and NBR compositions. These additional components include: fillers such as carbon black, calcium carbonate, magnesium oxide, etc.; curatives; stabilizers such as antioxidants; lubricants—both solid and liquid; extenders and rubber processing oils.

The NBR/EPAS blends of this invention may be used in either the cured or uncured state depending on the intended application and properties desired. For example, where good solvent and ozone resistance is required a full cure similar to that conventionally used in vulcanizing NBR and EPDM rubbers can be utilized. Where it is desired to prepare a thermoplastic elastomer blend which can be reprocessed by extrusion, injection molding etc., lower levels of curative, if any, are used. Typical curative levels for thermoplastic elastomer application range from 0 to about 40% of the amount necessary for full cure.

The proportion of NBR to EPAS in the blends of this invention is about 95/5 to about 5/95; preferably about 90/10 to about 40/60; most preferably about 80/20 to about 50/50 NBR/EPAS. It is also within the scope of this invention to include into the compositions minor amounts of a third compatible resin. For example, where an EPAS is prepared the NBR/EPAS blend can have incorporated into it a minor amount of styrene/acrylonitrile (SAN) resin. The third resin can be incorporated at about 2 to about 30 weight percent based on the overall composition; more preferably about 5 to about 20 percent, e.g., 10 weight percent.

The compositions of this invention may be prepared by any conventional rubber blending methods such as the use of 2-roll mills or internal mixers such as Banbury (trademark), Ko-Kneader (trademark), etc.

The tests used in evaluating the compositions of this invention include Stress-Strain tests (ASTM D-412); Oil Swell tests (ASTM 471).

The *Multiple Elongation Ozone Test* (MEOT) was used to evaluate relative ozone resistance. Test specimens were placed in fixtures which resulted in various elongation e.g. 10, 20 and 30% elongation. These fixtures were then placed in an ozone chamber at a specified ozone concentration and temperature. The hours to the onset of cracking were recorded.

An alternate measure of ozone resistance is the bent loop ozone test. Test specimens were bent and tied around a one inch mandrel. The samples were placed in an ozone chamber as above and the time was recorded to the observation of cracking.

The advantages of the instant invention may be more readily appreciated by reference to the following examples. The materials used in the Examples are described in the following table.

MATERIALS USED IN EXAMPLES

| NBR | ACN (% By Weight) | ML-4 @ 100° C. | Gel[1] |
|---|---|---|---|
| NBR I | 26.0 | 75 | less than 10% |
| NBR II | 29.5 | 80 | less than 10% |
| NBR III | 32.5 | 75 | less than 10% |
| NBR IV | 32.5 | 50 | less than 10% |
| NBR V | 39.0 | 65 | less than 10% |
| NBR VI | 44.5 | 48 | less than 10% |
| NBR VII | 32.0 | 55 | 80% (Divinyl benzene) |

| EDPM | E/P | Intrinsic Viscosity[2] | ML-4 | Termonomer |
|---|---|---|---|---|
| EPDM I | 61/39 | 1.3 | 65 @ 100° C. | 12% ENB |
| EPDM II | 52/48 | — | 60 @ 125° C. | 5% DCPD |

| EPAS and SAN | EPDM | % SAN | Styrene/ACN | Resin I.V.[3] | Graft |
|---|---|---|---|---|---|
| EPAS I | EPDM I | 50 | 74.4/25.6 | 0.57 | 0.56 |
| EPAS II | EPDM I | 45 | 75.3/24.7 | 0.39 | 0.69 |
| EPAS III | EPDM II | 50 | 67/33 | — | — |
| EPAS IV | EPDM II | 20 | 67/33 | — | — |
| SAN I | N.A. | 100 | 75/25 | 0.55 | — |

Notes
[1] gel in dimethyl formamide at 21° C.
[2] Intrinsic Viscosity in tetralin at 135° C.
[3] Intrinsic Viscosity in methylethyl ketone at 30° C.

Other Materials Used

| | |
|---|---|
| Accelerator I | N—butyl-2-benzothiazolesulfenamide |
| Accelerator II | Dipentamethylenethiuram hexasulfide |
| Accelerator III | Tetramethylthiuram disulfide |
| Peroxide I | 2,5-dimethyl-2,5-di(t-butylperoxy)hexane |
| DPG | diphenylguanidine |
| Antioxidant I | Zinc-2-mercaptobenzimidazole |
| Antioxidant II | Diphenylamine-acetone reaction product |
| Plasticizer I | Dioctyl adipate |
| Plasticizer II | Di(butoxy-ethoxy-ethyl)adipate |
| Filler I | Percipitated hydrated silica |
| Coupling Agent I | gamma glycidozypropyltrimethyloxy-silane |

EXAMPLES 1 AND 2

The compositions shown in Table I were prepared by mixing in a Brabender Plasticorder (trademark) with the jacket temperature maintained at 50° C. The blends were mixed at 50 RPM for three minutes and the final stock temperature was 150° C. The blends were then refined by passing each through a two-roll mill five times with the roll temperature at 155° C. Test specimens were cut from 5"×6"×1/10" compression molded plaques of the composition.

TABLE I

| | EXAMPLE NO. | |
|---|---|---|
| | 1 | 2 |
| Recipe | | |
| EPAS I | 20[1] | — |
| EPDM I | — | 20 |
| NBR V | 80 | 80 |
| SRF Carbon Black | 50 | 50 |
| Sulfur | 0.20 | 0.20 |
| Zinc Oxide | 0.60 | 0.60 |
| Stearic Acid | 0.20 | 0.20 |
| Accelerator I | 0.20 | 0.20 |
| DPG | 0.06 | 0.06 |
| Properties | | |
| Tensile at break (MPa) | 8.4 | 3.0 |
| Elongation (%) | 465 | 455 |
| % Volume Swell in ASTM Oil #3 (70 hrs. at 100° C.) | 34.0 | 85.9 |

[1] All constituents given in parts by weight

It is seen from a comparison of the date of Table I that the polymer blend of Example 1 using EPAS exhibits improved tensile and reduced oil swell over the blend of Example 2 which is outside the scope of the invention.

EXAMPLES 3 TO 10

The blends of Examples 3 to 10 where prepared by blending on a two-roll mill at 160° C. for 15 minutes. Test specimens were compression molded for 5 min. at 177° C. The EPAS was prepared in the manner taught in U.S. Pat. No. 3,538,191 incorporated herein by reference.

TABLE II

Blends of EPAS with Nitrile Rubber of Varying ACN Content

| EXAMPLE NO. | 3 | 4 | 5 | 6 | 7 | 8 | 9 | 10 |
|---|---|---|---|---|---|---|---|---|
| EPAS II | 50 | 50 | 50 | 50 | 50 | 50 | 50 | — |
| NBR I | 50 | — | — | — | — | — | — | — |
| NBR II | — | 50 | — | — | — | — | — | — |
| NBR III | — | — | 50 | — | — | — | — | — |
| NBR IV | — | — | — | 50 | — | — | — | — |
| NBR V | — | — | — | — | 50 | — | — | 50 |
| NBR VI | — | — | — | — | — | 50 | — | — |
| NBR VII | — | — | — | — | — | — | 50 | — |
| EPDM I | — | — | — | — | — | — | — | 25 |
| SAN I | — | — | — | — | — | — | — | 25 |
| Properties | | | | | | | | |
| 100% Modulus (MPa) | 3.4 | 2.7 | 3.5 | 3.2 | 3.5 | 3.7 | 5.2 | * |
| Tensile (MPa) | 3.4 | 3.0 | 4.3 | 3.7 | 12.1 | 10.1 | 8.5 | |
| Elongation (%) | 120 | 100 | 120 | 200 | 700 | 550 | 200 | |

*Components did not knit together, no cohesion. Physical properties too poor to test.

A comparison of Examples 3 to 8 demonstrate the effect of varying the acrylonitrile content of the NBR. Optimum physical properties are obtained when the ACN content of the NBR is about 35 to about 45 weight percent; more preferably about 37 to about 42%.

The data of Example 9 demonstrates that blends with good physical properties can be prepared from gelled NBR. On the other hand when the NBR was blended with EPDM and SAN as in Example 10 the blend was a heterogeneous mixture without cohesion. It was not possible to carry out physical tests on that blend.

EXAMPLES 11 TO 19

The blends of these Examples were prepared to demonstrate the effect of cure level, NBR/EPAS ratio type curative and type of EPAS used on overall blend properties. The blend of Examples 11 to 19 were prepared in the same manner as those of Examples 1 and 2 with the exception that the blend of Example 18 was mixed in the Brabender Plastograph for three minutes without curative and then for 4 minutes after the curatives were added. Refining and molding was in the manner of the prior examples. The blend composition and performance data for these Examples appear in Table III.

TABLE III

Partially Cured Blends of NBR/EPAS

| EXAMPLE NO. | 11 | 12 | 13 | 14 | 15 | 16 | 17 | 18 | 19 |
|---|---|---|---|---|---|---|---|---|---|
| Recipe | | | | | | | | | |
| NBR V | 80 | 80 | 80 | 50 | 50 | 60 | 80 | 80 | 80 |
| EPAS I | 20 | 20 | 20 | 50 | 50 | 40 | — | — | — |
| EPAS II | — | — | — | — | — | — | 20 | 20 | 20 |
| Sulfur | 0.2 | 0.3 | 0.4 | 0.2 | — | — | 0.3 | 0.4 | 0.5 |
| Zinc Oxide | 0.6 | 0.9 | 1.2 | 0.6 | — | — | 0.9 | 1.2 | 1.5 |
| Accelerator I | 0.2 | 0.3 | 0.4 | 0.2 | — | — | 0.3 | 0.4 | 0.5 |
| DPG | 0.06 | 0.09 | 0.12 | 0.06 | — | — | 0.09 | 0.12 | 0.15 |
| Stearic Acid | 0.2 | 0.3 | 0.4 | 0.2 | — | — | 0.3 | 0.4 | 0.5 |
| Peroxide I | — | — | — | — | 0.50 | 0.6 | — | — | — |
| SRF Carbon Black | 50 | 50 | 50 | 50 | 50 | 50 | 50 | 50 | 50 |
| Properties | | | | | | | | | |
| 100% Modulus (MPa) | 3.4 | 3.9 | 4.7 | — | — | — | 3.6 | 3.7 | 4.3 |
| Tensile Strength (MPa) | 4.8 | 11.2 | 14.6 | 11.0 | 14.3 | 13.2 | 9.9 | 11.2 | 16.2 |
| Elongation (%) | 465 | 430 | 340 | 150 | 200 | 200 | 465 | 470 | 450 |
| Elongation Set (%) | 85 | 65 | 40 | — | — | — | 100 | 85 | 50 |
| Hardness (Shore A) | — | — | — | 95 | 92 | 90 | 80 | 82 | 81 |
| % Vol. swell (Oil #3, 70 hr., 100° C.) | 34.0 | 35.3 | 32.6 | 105.5 | 78.0 | 66.8 | — | — | — |
| Flow | good | fair | poor | | | | | | |

Examples 11–13 demonstrate the effect of cure level on physical properties. It can be seen that higher cure levels result in higher tensile and lower swell at the expense of flow. Example 14 demonstrates that at NBR contents of 50% or less a partial cure does not result in good solvent resistance.

Examples 15 and 16 demonstrate that peroxides are effective as curatives in the practice of this invention.

Examples 17–19 demonstrate that any EPDM may be used for the graft spine.

In general the blends of Examples 11–19 are all useful, since different applications require varying degrees of tensile strength, ozone resistant, solvent resistant of flow.

EXAMPLES 20 TO 24

The Examples set forth in Table IV demonstrate that additional resin having the same composition of the free resin of the graft may be added without detracting from the advantageous properties of the blends of this invention.

These blends were prepared by blending the components for seven minutes in a Brabender mixer. The initial stock temperature was 121° C. Cure was effected by allowing the stock temperature to rise to 160° C. over a four minute period.

TABLE IV

|  | EXAMPLE NO. | | | | |
| --- | --- | --- | --- | --- | --- |
|  | 20 | 21 | 22 | 23 | 24 |
| Recipe |  |  |  |  |  |
| NBR V | 80 | 75 | 70 | 60 | 60 |
| EPAS III | 20 | 20 | 20 | 20 | 20 |
| SAN I | — | 5 | 10 | 20 | 20 |
| Sulfur | 0.3 | 0.281 | 0.263 | 0.224 | 0.112 |
| Zinc Oxide | 0.9 | 0.84 | 0.79 | 0.68 | 0.34 |
| Accelerator I | 0.3 | 0.281 | 0.263 | 0.224 | 0.112 |
| DPG | 0.09 | 0.084 | 0.079 | 0.068 | 0.034 |
| Stearic Acid | 0.3 | 0.281 | 0.263 | 0.224 | 0.112 |
| SRF Carbon Black | 50 | 50 | 50 | 50 | 50 |
| Properties[1] |  |  |  |  |  |
| 100% Modulus (MPa) | 3.6 | 5.1 | 8.3 | 13.0 | 10.6 |
| Tensile Strength (MPa) | 9.9 | 10.5 | 12.4 | 14.5 | 13.0 |
| Elongation (%) | 465 | 420 | 320 | 265 | 280 |
| Elongation Set (%) | 100 | 90 | 70 | 65 | 85 |
| Hardness (Shore A) | 80 | 82 | 88 | 95 | 90 |
| Extrudability[2] | poor | poor | poor | poor | excellent |

[1]Properties are on pieces from extruded strips.
[2]Appearance of 1" strip (from .020" × 1.0" die) extruded at 400° F. on laboratory extruder.

EXAMPLES 25-28

The samples of these Examples were prepared by blending in a Brabender mixer as in Example 1 and curing in a press at 177° C. for thirty minutes to effect a cure before testing.

The data presented in Table V show that a wide range of EPAS/NBR ratio may be used in preparing the blends of this invention. Further, a comparison of Examples 25 and 28 show that a wide range of EPDM content in the EPAS may be used without adversely affecting oil resistance and ozone resistance.

TABLE V

| Fully Cured Oil/Ozone Resistant Blends | | | | |
| --- | --- | --- | --- | --- |
|  | EXAMPLE NO. | | | |
|  | 25 | 26 | 27 | 28 |
| EPAS I | 20 | 30 | 40 | — |
| EPAS IV | — | — | — | 20 |
| NBR V | 80 | 70 | 60 | 80 |
| Cure System/Additives | (1) | (1) | (1) | (1) |
| Properties |  |  |  |  |
| 100% Modulus (MPa) | 5.0 | 7.5 | 11.0 | 3.6 |
| Tensile Strength (MPa) | 18.0 | 17.8 | 18.3 | 15.2 |
| Elongation (%) | 400 | 300 | 210 | 335 |
| Hardness (Shore A) | 85 | 87 | 90 | 76 |
| % Swell |  |  |  |  |
| Fuel B (70 hrs. @ 21° C.) | 18.2 | 30.1 | 54.4 | — |
| Oil #3 (70 hrs. @ 100° C.) | 13.8 | 25.6 | 42.4 | 33.8 |
| Temperature Retraction (T-10)(°C.) | −12 | −10 | −10 | — |
| Ozone Resistance (50 pphm, 21° C.) (2) |  |  |  |  |
| 10% Elongation (hrs. to fail) | 120 | >380 | >384 | >288 |
| 20% Elongation (hrs. to fail) | 24 | 48 | 336 EC | 288 |
| 30% Elongation |  |  |  |  |

TABLE V-continued

| Fully Cured Oil/Ozone Resistant Blends | | | | |
| --- | --- | --- | --- | --- |
|  | EXAMPLE NO. | | | |
|  | 25 | 26 | 27 | 28 |
| (hrs. to fail) | 4 | 24 | 120 EC | 24 |

(1) SRF carbon black, 50; Zinc Oxide, 3.0; stearic acid, 1.0; accelerator, 1.0; DPG, 0.3; Sulfur, 1.0.
(2) Failure is point at which cracks first become visible, EC denotes edge cracking only.

EXAMPLES 29-31

These Examples illustrate the useful balance of properties obtainable using blends of the invention in fully-cured recipes containing both white and black fillers. Such compounds have utility in hose covering because of their good balance of low oil swell, low temperature flexibility, heat resistance and ozone resistance. The recipes used in these Examples are shown in Table VI and are illustrative of the range of additives which may be used in the practice of this invention.

TABLE VI

| Recipe for Fully Cured EPAS/NBR Blends with White and Black Fillers | | | |
| --- | --- | --- | --- |
|  | EXAMPLE NO. | | |
|  | 29 | 30 | 31 |
| NBR IV | 80 | 75 | 75 |
| EPAS I | 20 | — | — |
| EPAS IV | — | 25 | 25 |
| Zinc Oxide | 5 | 5 | 5 |
| Stearic Acid | 1 | 1 | 1 |
| Accelerator II | 0.9 | 0.9 | — |
| Accelerator I | 1.5 | 1.5 | 2.1 |
| Antioxidant I | 3 | 3 | 3 |
| Antioxidant II | 1.5 | 1.5 | 2.5 |
| Plasticizer I | 10 | 7.5 | — |
| Plasticizer II | 7.5 | 20 | — |
| Filler I | 40 | 40 | — |
| Coupling Agent I | 0.5 | 0.5 | — |
| Cd Stearate | 1.4 | 1.4 | — |
| Accelerator III | — | — | 3.5 |
| Spider Sulfur | — | — | 0.1 |
| SRF Carbon Black | — | — | 70 |

Samples of Examples 29 and 30 were blended in a "B" Banbury in the following manner:

The polymers and ⅔ of the filler and Coupling agent were mixed for 1½ minutes at #1 speed. All other ingredients, with the exception of Accelerator I and Accelerator II were added and then blended for six minutes. The dump temperature was 132° C. The blend was then transferred to a warm mill (38°–49° C.) and the accelerators added and milled for five minutes. The compositions were press cured for 30 minutes at 160° C. In preparing the sample of Example 31 the carbon black, plasticizers, antioxidants and polymers were added to a "B" Banbury in that order and blended for four minutes to a dump temperature of 121° C. The accelerators and sulfur were then added on a warm mill and milled for five minutes. The compounds were then press cured at 160° C. for thirty minutes.

The test results on these blends are shown in Table VII.

TABLE VII

| Properties of Compounds of Example 29-31 | | | |
| --- | --- | --- | --- |
|  | EXAMPLE NO. | | |
|  | 29 | 30 | 31 |
| Unaged Properties |  |  |  |
| 100% Modulus (MPa) | 1.5 | 1.4 | 2.9 |

TABLE VII-continued
Properties of Compounds of Example 29-31

| | EXAMPLE NO. | | |
|---|---|---|---|
| | 29 | 30 | 31 |
| 300% Modulus (MPa) | 5.5 | 5.6 | 11.2 |
| Tensile at break (MPa) | 18.3 | 15.9 | 14.0 |
| % Elongation | 645 | 605 | 400 |
| Hardness (Shore A) | 67 | 60 | 63 |
| Temperature Retraction, TR-10 (°C.) | −35 | −36 | −36 |
| Ozone Resistance, Bent loop, 100 pphm @ 38° C., hours to cracking | 6 | 6 | 6 |
| Compression set[1] (%) Aged 70 hrs. @ 125° C. (air oven) | 54 | 50 | 49 |
| Tensile at break (% retention) | 93 | 96 | 109 |
| Elongation at break (% retention) | 74 | 72 | 50 |
| Hardness (points change, Shore A) | +11 | +11 | +16 |
| Aged in Oil #3 - 70 hrs. @ 125° C. | | | |
| Tensile (% retention) | 62 | 55 | 79 |
| Elongation at break (% retention) | 70 | 64 | 65 |
| Hardness (points change Shore A) | −13 | −21 | −11 |
| % Swell | +28 | +50 | +33 |

[1]70 hrs. @ 125° C. ASTM D-395 Methyl B measure on ½" button cured 45' @ 160° C.

As is evident from the data, physical properties of the blends are good. The blends exhibit excellent compression set and oil swell resistance properties. These blends also show good retention of tensile and elongation properties after aging.

EXAMPLES 32-33

Use of EPAS Graft in Blends with EPDM and NBR

| | EXAMPLE NO. | |
|---|---|---|
| | 32 | 33 |
| EPAS I | 20 | — |
| EPDM II | 30 | 40 |
| NBR V | 50 | 50 |
| SAN I | — | 10 |
| Sulfur | 0.16 | 0.16 |
| Zinc Oxide | 0.47 | 0.47 |
| Stearic Acid | 0.16 | 0.16 |
| Accelerator I | 0.16 | 0.16 |
| DPG | 0.05 | 0.05 |

Table VIII illustrates that EPDM and NBR may be made compatible in blends by the addition of EPAS to the system. The blends of Example 32 was coherent and well dispersed while the composition of 33 was not well knit and could not be made homogeneous despite prolonged mixing.

Although the invention has been described in terms of an NBR rubber and an EPAS it will be obvious to those skilled in the art that the EPAS will form compatible blends with an acrylonitrile containing elastomer e.g., acrylonitrile/butadiene/styrene. The term "acrylonitrile resin" as used in the specification and claims means having polymers of acrylonitrile as well as co- and terpolymers of acrylonitrile with an ethylenically unsaturated aromatic monomer. The term "acrylonitrile elastomer" as used in the specification and claims means NBR and elastomers which are co- and terpolymers of ACN with a $C_4$–$C_8$ conjugated diene e.g. butadiene and ACN with such dienes and an ethylenically unsaturated aromatic monomer.

What is claimed is:

1. A polymer blend composition which comprises:
   (A) a butadiene-acrylonitrile copolymer elastomer; and
   (B) a graft polymer comprising
      (1) an EPDM substrate, onto which has been grafted a superstrate which is
      (2) an acrylonitrile resin,
   wherein the weight ratio of (A) to (B) is about 95:5 to 5:95.

2. The composition of claim 1 wherein the acrylonitrile resin is polyacrylonitrile.

3. The composition of claim 1 wherein the acrylonitrile resin is a copolymer of acrylonitrile and an ethylenically unsaturated aromatic monomer.

4. The composition of claim 3 wherein the ethylenically unsaturated aromatic monomer is styrene, alpha-methylstyrene or chlorostyrene.

5. The composition of claim 4 wherein the aromatic monomer is styrene.

6. The composition of claim 1 wherein the weight ratio of (A) to (B) is about 95:5 to about 50:50.

7. The composition of claim 1 or 6 wherein the weight ratio of acrylonitrile resin (2) to EPDM (1) is about 5:95 to about 70:30.

8. The composition of claim 7 wherein the weight ratio of acrylonitrile resin (2) to EPDM (1) is 10:90 to 60:40.

9. The composition of claim 1 which contains free resin which is an acrylonitrile resin.

10. The composition of claim 1 wherein the butadiene-acrylonitrile copolymer comprises 20 to 50 weight percent acrylonitrile.

11. The composition of claim 4 or 5 wherein the weight ratio of acrylonitrile to ethylenically unsaturated aromatic monomer is 90:10 to 10:90.

12. The composition of claim 11 where the ratio is 80:20 to 60:40.

13. The composition of claim 1 wherein the EPDM comprises a terpolymer of ethylene, propylene and a non-conjugated diene.

14. The composition of claim 13 wherein the diene is dicyclopentadiene, 5-ethylidiene-2-norbornene or 1,4-hexadiene.

15. A composition of matter comprising the cured composition of claim 1.

* * * * *